(12) United States Patent
Yonekawa

(10) Patent No.: US 8,647,421 B2
(45) Date of Patent: Feb. 11, 2014

(54) $CO_2$ RECOVERY APPARATUS

(75) Inventor: Takahito Yonekawa, New York, NY (US)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/096,254

(22) Filed: Apr. 28, 2011

(65) Prior Publication Data

US 2012/0234177 A1 Sep. 20, 2012

Related U.S. Application Data

(60) Provisional application No. 61/453,627, filed on Mar. 17, 2011.

(51) Int. Cl.
*B01D 53/14* (2006.01)

(52) U.S. Cl.
USPC ................ 96/242; 95/183; 95/227; 95/236

(58) Field of Classification Search
None
See application file for complete search history.

(56) References Cited

U.S. PATENT DOCUMENTS

| | | | |
|---|---|---|---|
| 3,435,590 A * | 4/1969 | Smith | 95/174 |
| 3,773,895 A * | 11/1973 | Thirkell | 423/223 |
| 5,618,506 A | 4/1997 | Suzuki et al. | |
| 7,918,926 B2 * | 4/2011 | Iijima et al. | 96/234 |
| 2009/0282977 A1 | 11/2009 | Koss | |

(Continued)

FOREIGN PATENT DOCUMENTS

| | | |
|---|---|---|
| EP | 1 736 231 A1 | 12/2006 |
| EP | 2 228 119 A1 | 9/2010 |

(Continued)

OTHER PUBLICATIONS

Partial European Search Report dated Jun. 20, 2012, issued in corresponding European Patent Application No. 12159871.8 (5 pages).
Extended European Search Report dated Sep. 7, 2012, issued in corresponding European Patent Application No. 12159871.8 (11 pages).

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

[Problem to be solved] A $CO_2$ recovery apparatus which can significantly reduce the amount of steam and provide further improved energy efficiency is provided.
[Solution] The apparatus includes: a flue gas cooling apparatus 14 for allowing cooling water 13 to cool a $CO_2$ and $O_2$ containing flue gas 12 that is emitted from an industrial combustion facility 11 such as a boiler or gas turbine; a $CO_2$ absorber 16 having a $CO_2$ recovery section 16A for bringing the cooled $CO_2$ containing flue gas 12 and a $CO_2$ absorbing $CO_2$ absorbent 15 into contact with each other to remove $CO_2$ from the flue gas 12; and an absorbent regenerator 18 for releasing $CO_2$ from a $CO_2$ absorbed $CO_2$ absorbent 17 to regenerate the $CO_2$ absorbent. The apparatus further includes: a cleansing water divert line 51 for diverting partial cleansing water 19*a* of circulating cleansing water 19 that has been condensed in a cleansing section 16B in the $CO_2$ absorber 16; a first heat exchanger 52 disposed in the divert line 51 and in a boiler flue gas duct 11*a*; and a superheated cleansing solution supply line 53 for directing, into the bottom portion of the absorbent regenerator 18, a superheated cleansing solution 19*b* having heat exchanged with a first heat exchanger 52.

4 Claims, 6 Drawing Sheets

(56) References Cited

U.S. PATENT DOCUMENTS

| | | |
|---|---|---|
| 2010/0229723 A1 | 9/2010 | Gelowitz et al. |
| 2010/0319540 A1* | 12/2010 | Garcia Andarcia et al. .... 95/180 |
| 2011/0056377 A1* | 3/2011 | Moniwa et al. ................. 96/144 |
| 2011/0283885 A1* | 11/2011 | Thiele et al. .................... 95/199 |
| 2012/0125196 A1 | 5/2012 | Woodhouse et al. |

FOREIGN PATENT DOCUMENTS

| | | |
|---|---|---|
| JP | 07-051537 A | 2/1995 |
| JP | 2005-254212 A | 9/2005 |
| JP | 2007-284273 A | 11/2007 |
| WO | 2008/144918 A1 | 12/2008 |
| WO | 2010/142716 A1 | 12/2010 |

\* cited by examiner

$CO_2$ RECOVERY APPARATUS

TECHNICAL FIELD

The present invention relates to a $CO_2$ recovery apparatus which can reduce the amount of steam in regenerating a $CO_2$ absorbent.

BACKGROUND ART

Recent years have seen the greenhouse effect by $CO_2$, which has been pointed out to be one of the causes of global-warming and thus has to be urgently stopped on a worldwide scale in order to protect the global environment. Carbon dioxide ($CO_2$) is emitted from any human activity where fossil fuel is burnt, and the demand for suppressing the emission tends to increasingly grow. Accordingly, this demand has raised intensive studies relating to power generation facilities such as thermal power plants which use a large amount of fossil fuel. The studies were focused on a method for bringing boiler flue gases into contact with an amine-based $CO_2$ absorbent to reduce and recover $CO_2$ in the flue gas, and a method for storing the recovered $CO_2$ without releasing it into the atmospheric environment. The process of reducing and recovering $CO_2$ from a flue gas using such a $CO_2$ absorbent as mentioned above employs the step of bringing the flue gas and the $CO_2$ absorbent into contact with each other in the absorber. Also employed is the step of heating the $CO_2$ absorbed absorbent in the regenerator to release $CO_2$ and regenerate and circulate the absorbent back to the absorber for reuse (for example, see Patent Document 1).

In the method for absorbing, reducing, and recovering $CO_2$ from a $CO_2$ containing gas like a flue gas by employing the $CO_2$ absorbent and the process mentioned above, these steps are implemented in the combustion facility and thus its operational costs must be reduced as much as possible. In particular, the regenerative step of the process requires a large amount of heat energy consumption and thus needs to be implemented as the most possible energy efficient step.

In this context, it has been suggested that part of a semi-lean solution is diverted out of the regenerator to exchange heat with a lean solution in a heat exchanger, and then, the resulting semi-lean solution is allowed to exchange heat with a steam condensed water at a heat exchanger. The solution is then returned to a lower portion downstream of the diverting position to allow the regenerator to increase the temperature of the semi-lean solution supplied to the lower portion, thereby reducing steam consumption (for example, see Patent Document 2 (the eighth embodiment, FIG. 17)).

DOCUMENTS OF PRIOR ART

Patent Document

[Patent Document 1] Japanese Patent Application Laid-Open No. H7-51537
[Patent Document 2] Japanese Patent Application Laid-Open No. 2005-254212

DISCLOSURE OF INVENTION

Problem to be Solved by the Invention

In recovering heat using an absorbent (for example, semi-lean solution), the absorbent is used for recovery of heat at a high temperature. This causes the absorbent to recover only a limited amount of heat and to be incapable of being raised to a high temperature from a viewpoint of degradation of the absorbent itself due to heat.

It has also been suggested that the superheated vapor generated by heat recovery should be used in the regenerative superheater. However, this raises a problem that the recovered heat to be transmitted into the system via the regenerative superheater requires a temperature difference, which causes only a limited amount of heat to be recovered.

In this context, to reduce heat energy consumption in the regenerative step, it has been desired to further reduce the amount of steam.

In view of the aforementioned problems, it is an object of the present invention to provide a $CO_2$ recovery apparatus which can significantly reduce the amount of steam and which can provide a further improved energy efficiency.

Means for Solving Problem

According to an aspect of the present invention, a $CO_2$ recovery apparatus includes: a $CO_2$ absorber for bringing a $CO_2$ containing gas and a $CO_2$ absorbent into contact with each other to reduce $CO_2$; and an absorbent regenerator for regenerating a $CO_2$ absorbed rich solution in a regenerative superheater. The $CO_2$ recovery apparatus allows a lean solution with $CO_2$ reduced in the absorbent regenerator to be recycled as a $CO_2$ absorbent in the $CO_2$ absorber. The $CO_2$ recovery apparatus is characterized by including a heat exchange section for exchanging heat with part of cleansing water diverted from a cleansing section disposed downstream of a gas flow in the $CO_2$ absorber, and a superheated cleansing solution supply line for directing, into a bottom portion of the absorbent regenerator, the superheated cleansing solution having heat exchanged in the heat exchange section.

Advantageously, in the $CO_2$ recovery apparatus, the heat exchange section is any one of or both of a first heat exchanger disposed in a boiler flue gas duct or a second heat exchanger disposed downstream of a $CO_2$ compressor in a $CO_2$ compressive line.

Advantageously, in the $CO_2$ recovery apparatus, the absorbent regenerator is divided at least into two, and the $CO_2$ recovery apparatus includes: a semi-lean solution divert line for diverting a semi-lean solution with $CO_2$ partially reduced from an upper stage of the divided absorbent regenerator to supply to a lower stage of the absorbent regenerator, and a steam condensed water heat exchanger, disposed in the semi-lean solution divert line, for heating the semi-lean solution by afterheat of steam condensed water from the regenerative superheater.

Advantageously, in the $CO_2$ recovery apparatus, the semi-lean solution divert line is provided with a lean solution heat exchanger for heating a semi-lean solution using heat of the lean solution from the absorbent regenerator.

Advantageously, in the $CO_2$ recovery apparatus, a rich/lean solution heat exchanger for heating the rich solution using afterheat of the lean solution is disposed at an intersection of a rich solution supply line for supplying the rich solution from the $CO_2$ absorber to the regenerative superheater and a lean solution supply line for supplying the lean solution from the absorbent regenerator to the $CO_2$ absorber.

Effect of the Invention

According to the present invention, the heat exchanger exchanges heat with part of cleansing water or reflux water, thereby allowing heat recovery in which low-temperature cleansing water or reflux water is superheated, for example, to approximately 120° C. As a result, by supplying the superheated cleansing water to the bottom portion of the absorbent regenerator, the amount of water vapor to be supplied to the regenerative superheater can be reduced.

BEST MODES OF CARRYING OUT THE INVENTION

Now, the present invention will be described in more detail with reference to the accompanying drawings. Note that these embodiments are not intended to limit the present invention but these multiple embodiments also include combinations of each of those embodiments. Furthermore, the components in the embodiments to be described below include those that one skilled in the art can readily contemplate and that are substantially identical thereto.

First Embodiment

A description will now be made to a $CO_2$ recovery apparatus according to an embodiment of the present invention with reference to FIG. 1.

Figure 1:
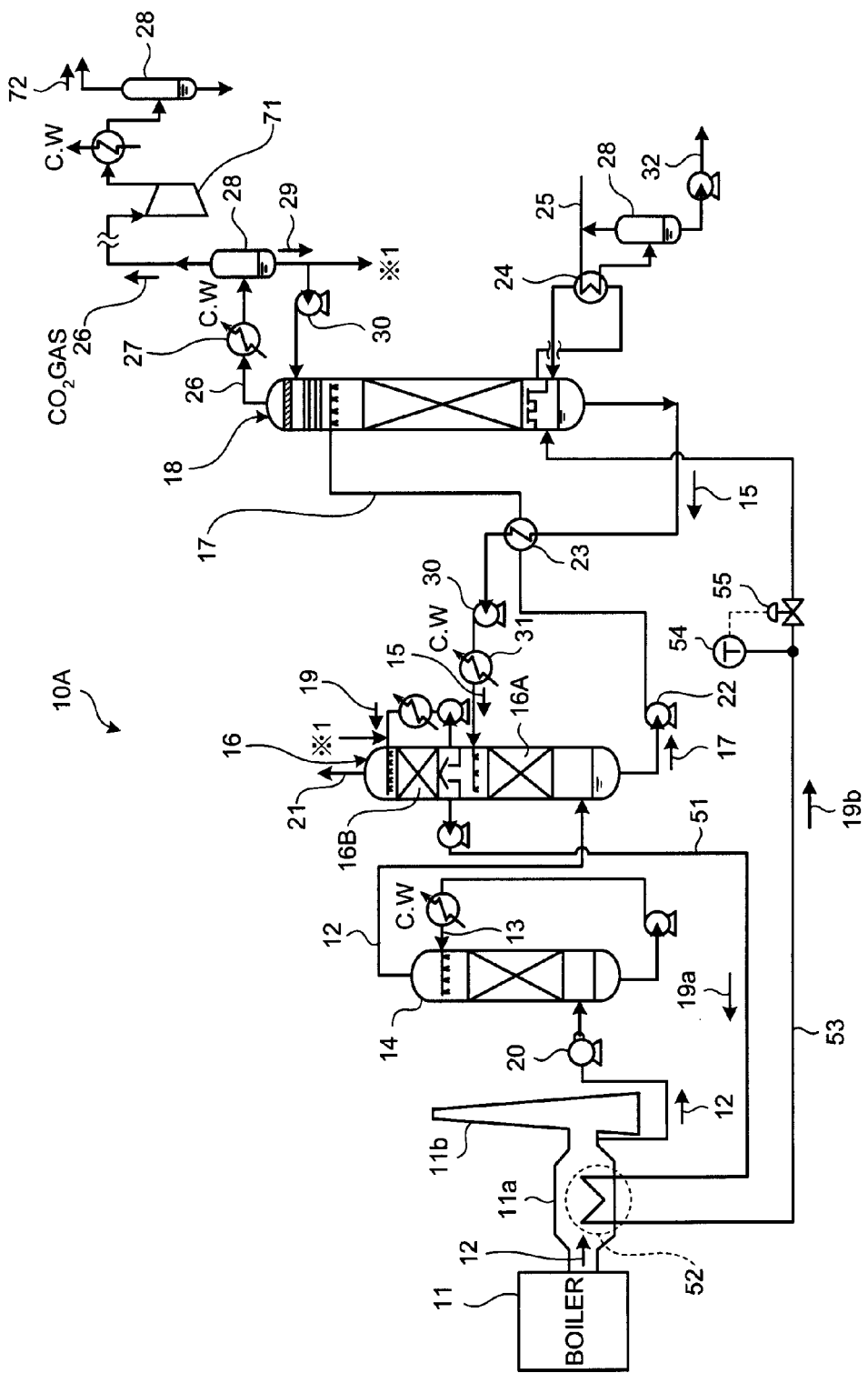
FIG. 1 is a schematic view illustrating the configuration of a $CO_2$ recovery apparatus according to a first embodiment.

FIG. 1 is a schematic view illustrating the configuration of a $CO_2$ recovery apparatus according to a first embodiment. As shown in FIG. 1, a $CO_2$ recovery apparatus 10A according to the first embodiment includes a flue gas cooling apparatus 14, a $CO_2$ absorber 16, and an absorbent regenerator 18. The flue gas cooling apparatus 14 uses cooling water 13 to cool flue gas 12 containing $CO_2$ and $O_2$ that are emitted from an industrial combustion facility 11, such as a boiler or gas turbine. The $CO_2$ absorber 16 includes a $CO_2$ recovery section 16A for bringing the cooled $CO_2$ containing flue gas 12 and a $CO_2$-absorbing $CO_2$ absorbent (hereinafter also referred to as the "absorbent") 15 into contact with each other to reduce $CO_2$ in the flue gas 12. The absorbent regenerator 18 causes $CO_2$ to be released from the $CO_2$-absorbed $CO_2$ absorbent (hereinafter also referred to as the "rich solution") 17 to regenerate the $CO_2$ absorbent. Then, the $CO_2$ recovery apparatus 10A allows the regenerated $CO_2$ absorbent (hereinafter also referred to as the "lean solution") 15 with $CO_2$ reduced in the regenerator 18 to be recycled as the $CO_2$ absorbent in the $CO_2$ absorber 16.

Note that in FIG. 1, reference symbol 11b shows a stack, and reference number 32 shows a steam condensed water. The $CO_2$ recovery apparatus may be a retrofitted one for recovering $CO_2$ from an existing flue gas source or one that is provided at the same time as a new flue gas source is installed. The stack 11b is provided with an open/close door which is closed while the $CO_2$ recovery apparatus is being operated. The stack 11b is also set so as to be opened when the flue gas source is operating but the $CO_2$ recovery apparatus has come to a standstill.

In a $CO_2$ recovery method using this $CO_2$ recovery apparatus, the $CO_2$ containing flue gas 12 from the industrial combustion facility 11, such as a boiler or gas turbine, is first raised in pressure in a flue gas blower 20. The resulting flue gas 12 is then fed to the flue gas cooling apparatus 14, where the flue gas 12 is cooled by the cooling water 13 and then fed to the $CO_2$ absorber 16.

In the $CO_2$ absorber 16, the flue gas 12 is brought into contact as a countercurrent flow with a $CO_2$ absorbent 15 utilizing an amine-based solution, so that $CO_2$ in the flue gas 12 is absorbed by the $CO_2$ absorbent 15 through chemical reaction.

The $CO_2$-free flue gas with $CO_2$ having been reduced in the $CO_2$ recovery section 16A is brought into gas-liquid contact with circulating cleansing water 19 that contains the $CO_2$ absorbent fed from a nozzle of a cleansing section 16B inside the $CO_2$ absorber 16. This allows for recovering the $CO_2$ absorbent 15 that accompanies the $CO_2$ free flue gas, and then the flue gas 21 with $CO_2$ reduced in amount is released out of the system.

Furthermore, the $CO_2$ absorbed $CO_2$ absorbent 17 or a rich solution is raised in pressure in a rich solution pump 22, heated in a rich/lean solution heat exchanger 23 by the $CO_2$ absorbent 15 or a lean solution regenerated in the regenerator 18, and then fed to the regenerator 18.

The rich solution 17 released from the top of the regenerator 18 into the inside thereof undergoes an endothermic reaction by the water vapor fed from the bottom portion, thereby releasing most of $CO_2$. The $CO_2$ absorbent, which has released part or most of $CO_2$ in the regenerator 18, is referred to as the semi-lean solution. The semi-lean solution will turn to the $CO_2$ absorbent 15 with almost all of $CO_2$ removed until the solution reaches the bottom portion of the regenerator 18. The lean solution is partially superheated by water vapor 25 in a regenerative superheater 24 and supplies water vapor into the regenerator 18.

On the other hand, the regenerator 18 outputs, from its head top, a $CO_2$ accompanying gas 26 that accompanies the water vapor which has been released from the rich solution 17 and the semi-lean solution in the tower. The water vapor is then condensed in a condenser 27 and separated from water in a separation drum 28, so that the $CO_2$ accompanying gas 26 is released out of the system to be compressed separately in a compressor 71 and recovered. The recovered $CO_2$ accompanying gas 26 is injected into oilfields by EOR (Enhanced Oil Recovery) or stored in an aquifer to take measures against global warming.

The reflux water 29 separated and refluxed from the $CO_2$ accompanying gas in the separation drum 28 is supplied to the upper portion of the regenerator 18 and toward the circulating cleansing water 19 side using a reflux water circulating pump 30.

The regenerated $CO_2$ absorbent (lean solution) 15 is cooled by the rich solution 17 in the rich/lean solution heat exchanger 23, then raised in pressure by the lean solution pump 30, then cooled by a lean solution cooler 31, and finally supplied into the $CO_2$ absorber 16.

The present embodiment further includes a cleansing water divert line 51 for diverting partial cleansing water 19a of the circulating cleansing water 19 condensed in the cleansing section 16B inside the $CO_2$ absorber 16, a first heat exchanger 52 disposed in the divert line 51 and a boiler flue gas duct 11a, and a superheated cleansing solution supply line 53 for introducing the superheated cleansing solution 19b having heat exchanged in the first heat exchanger 52 into the bottom portion of the absorbent regenerator 18.

Note that the superheated cleansing solution supply line 53 is provided with a thermometer 54 and a relief valve 55 to adjust the level of heat exchange of the superheated cleansing water (superheated vapor) 19*b* which has exchanged heat with the flue gas 12.

Conventionally, diverting the portion excluding the circulating water stream of circulating cleansing water would reduce the volume to be dropped in the absorption section and regenerated as a rich solution in the absorbent regenerator. Thus, this embodiment reduces the regeneration energy in the absorbent regenerator and further allows the diverted cleansing solution to exchange heat with the flue gas (at a gas temperature of 140 to 200° C.) 12 in the first heat exchanger 52. This allows for realizing heat recovery by superheating the cleansing water at about 50° C., for example, to approximately 120° C. As a result, since the superheated cleansing water 19*b* is supplied to the bottom portion of the absorbent regenerator 18 via the superheated cleansing solution supply line 53, the amount of water vapor 25 to be supplied to the regenerative superheater 24 can be reduced.

In particular, since the condensed cleansing water 19 in the cleansing section 16B is at a relatively lower temperature than in any other steps of the process, a larger amount of heat can be recovered to thereby maximize the amount of recovered heat for the regenerator.

Furthermore, since the cleansing water 19 contains a low concentration of the absorbent, there is only a small amount of heat degradation caused by heat exchange with the flue gas 12.

Furthermore, since the heat-recovered superheated cleansing water 19*b* is supplied to the bottom portion of the absorbent regenerator 18, the absorbent supplied separately as the rich solution 17 to the top portion of the absorbent regenerator 18 contains a concentration of absorbent (amine) which is higher than usual. As a result, when the same water balance is held in the system, the amount of water to be evaporated in the absorbent regenerator 18 is reduced, thereby allowing the regeneration energy to decrease.

The superheated cleansing solution or water circulates the closed system of both the $CO_2$ absorber 16 and the absorbent regenerator 18 in the $CO_2$ recovery apparatus 10A. This makes it possible to maintain water balance.

That is, externally supplying superheated vapor would require an excessive amount of water to be discharged out of the system, thus causing water balance to be lost.

Second Embodiment

Now, a description will be made to a $CO_2$ recovery apparatus according to an embodiment of the present invention with reference to FIG. 2. Note that the same members as those of the first embodiment will be denoted with the identical symbols without describing them repeatedly.

Figure 2:
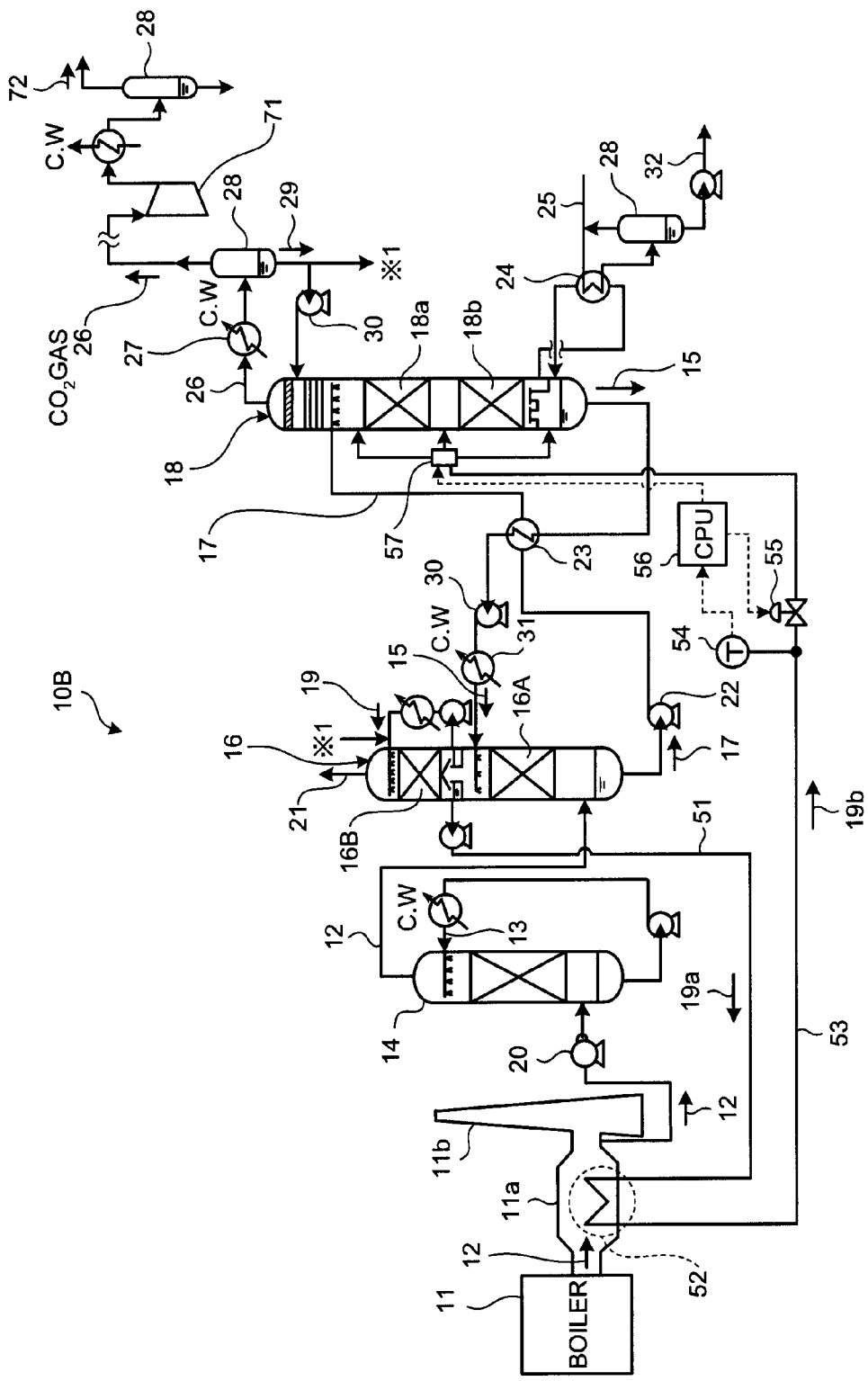
FIG. 2 is a schematic view illustrating the configuration of a $CO_2$ recovery apparatus according to a second embodiment.

FIG. 2 is a schematic view illustrating the configuration of a $CO_2$ recovery apparatus according to a second embodiment. As shown in FIG. 2, a $CO_2$ recovery apparatus 10B according to the second embodiment is different from the $CO_2$ recovery apparatus 10A of the first embodiment in that the destination of the superheated cleansing water 19*b* can be changed.

In the first embodiment, the superheated cleansing water 19*b* is supplied to the bottom portion of the absorbent regenerator 18. However, when the superheated cleansing water is at a low temperature, supplying to the bottom portion will cause the lean solution, with which heat was exchanged in the regenerative superheater 24, to have a lowered steam temperature.

In this context, to exchange heat at a lower exchange temperature in the first heat exchanger 52, the superheated cleansing water 19*b* is to be supplied to the middle stage portion (between a first stage portion 18*a* and a second stage portion 18*b*) or the upper stage portion of the absorbent regenerator 18.

To change the destination, a command from a controller 56 is issued to change the destination at a flow path switch section 57 in accordance with a measurement result obtained by the thermometer 54 disposed in the superheated cleansing solution supply line 53.

For example, if a measurement at the thermometer 54 shows that the superheated cleansing water is, for example, at 120° C. or higher, the water is introduced into the bottom portion of the absorbent regenerator 18. If the water is in the form of vapor, for example, at temperatures of from 100 to 120° C., the vapor is introduced into the middle portion of the absorbent regenerator 18. If the water is, for example, below 100° C., then the water is introduced into the upper portion of the absorbent regenerator 18.

Third embodiment

Now, a description will be made to a $CO_2$ recovery apparatus according to an embodiment of the present invention with reference to FIG. 3. Note that the same members as those of the first embodiment will be denoted with the identical symbols without describing them repeatedly.

Figure 3:
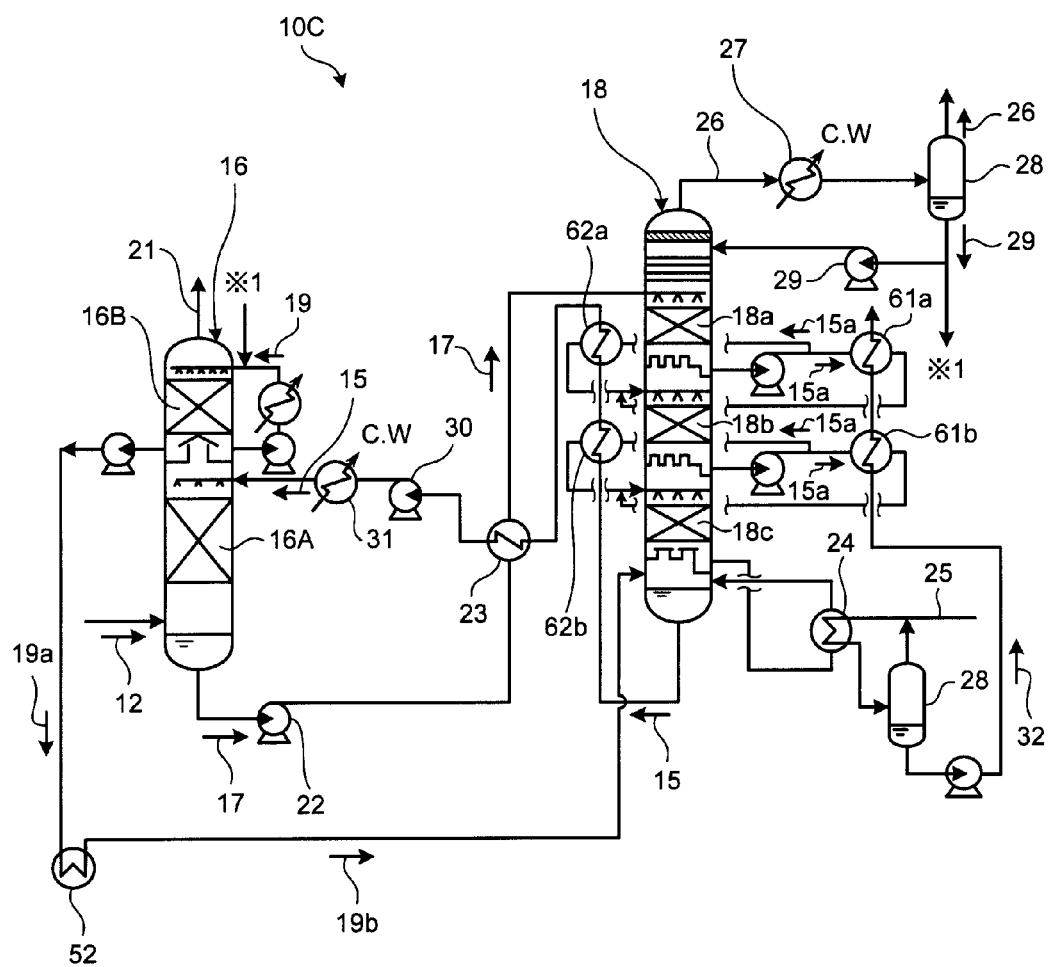
FIG. 3 is a schematic view illustrating the configuration of a $CO_2$ recovery apparatus according to a third embodiment.

FIG. 3 is a schematic view illustrating the configuration of a $CO_2$ recovery apparatus according to a third embodiment. Here, FIG. 3 shows part of the whole system of FIG. 1 or the main portions such as the absorber and the regenerator with the other components being identical to those of the first embodiment.

As shown in FIG. 3, a $CO_2$ recovery apparatus 10C according to the third embodiment is different from the $CO_2$ recovery apparatus 10A of the first embodiment in that the interior of the absorbent regenerator 18 is divided into three portions including a first stage portion 18*a*, a second stage portion 18*b*, and a third stage portion 18*c*.

Then, the semi-lean solution 15*a* diverted from each of them undergoes heat exchange with the afterheat of the steam condensed water 32 in both a first steam condensed water heat exchanger 61*a* and a second steam condensed water heat exchanger 61*b*. Furthermore, part of the diverted semi-lean solution 15*a* undergoes heat exchange with the heat of the lean solution 15 in both a first lean solution heat exchanger 62*a* and a second lean solution heat exchanger 62*b*.

In the present embodiment, the afterheat of the steam condensed water 32 used in the regenerative heater 24 and the heat of the lean solution 15 are effectively used. As a result, in addition to the effects of the first embodiment, it is possible to further reduce the amount of supplied steam to be used in the regenerator 18.

Note that the present embodiment simultaneously makes use of the afterheat of the steam condensed water 32 and the heat of the lean solution 15. However, they may also be used separately.

Fourth Embodiment

Now, a description will be made to a $CO_2$ recovery apparatus according to an embodiment of the present invention with reference to FIG. 4. Note that the same members as those of the first embodiment will be denoted with the identical symbols without describing them repeatedly.

Figure 4:
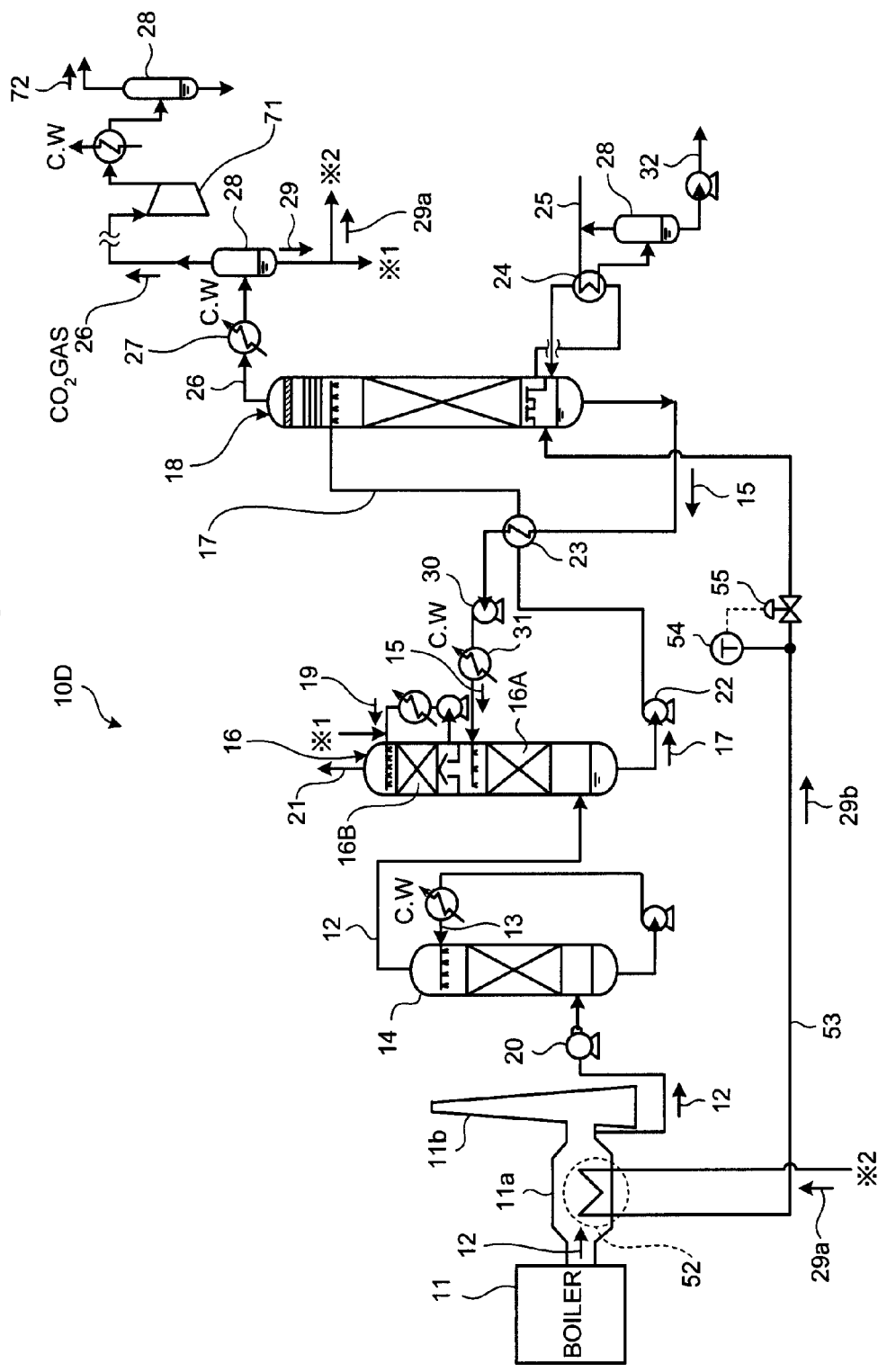
FIG. 4 is a schematic view illustrating the configuration of a $CO_2$ recovery apparatus according to a fourth embodiment.

FIG. 4 is a schematic view illustrating the configuration of a $CO_2$ recovery apparatus according to a fourth embodiment.

As shown in FIG. 4, a $CO_2$ recovery apparatus 10D according to the fourth embodiment is different from the $CO_2$ recovery apparatus 10A of the first embodiment in that part 29a of the reflux water 29 undergoes heat exchange in the heat exchange section 52 within the flue gas duct 11a and turns to superheated reflux water 29b. Then, this superheated reflux water 29b is supplied to the bottom portion of the absorbent regenerator 18.

Since the reflux water 29 is at a low temperature like the cleansing water, it is possible to recover a large amount of heat and thus maximize the amount of recovered heat for the regenerator. Furthermore, a very low concentration of the absorbent contained in the reflux water 29 also leads to a reduced amount of heat degradation caused by heat exchange with the flue gas 12.

Fifth Embodiment

Now, a description will be made to a $CO_2$ recovery apparatus according to an embodiment of the present invention with reference to FIG. 5. Note that the same members as those of the first embodiment will be denoted with the identical symbols without describing them repeatedly.

Figure 5:
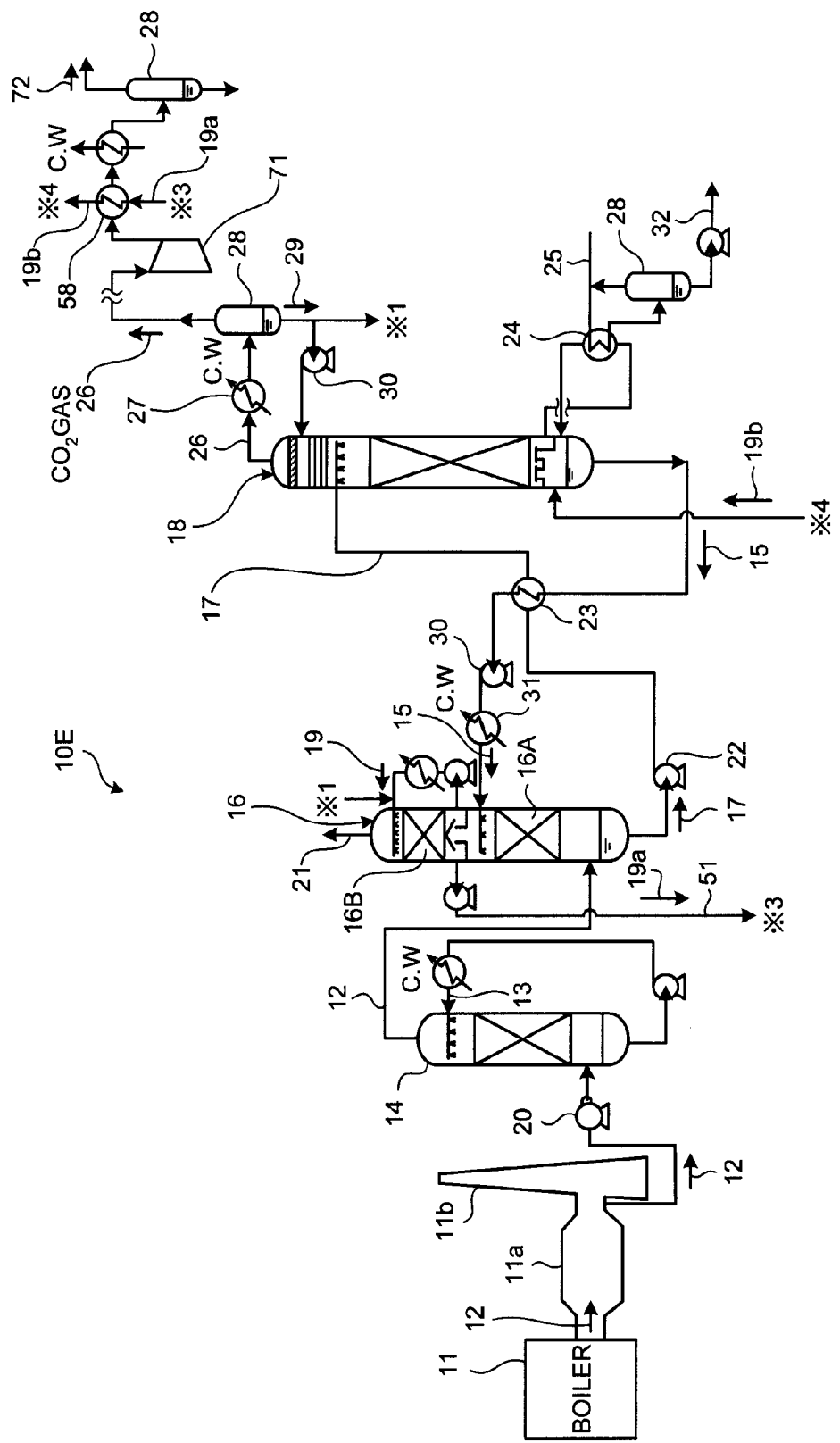
FIG. 5 is a schematic view illustrating the configuration of a $CO_2$ recovery apparatus according to a fifth embodiment.

FIG. 5 is a schematic view illustrating the configuration of a $CO_2$ recovery apparatus according to a fifth embodiment.

As shown in FIG. 5, a $CO_2$ recovery apparatus 10E according to the fifth embodiment is different from the $CO_2$ recovery apparatus 10A of the first embodiment in that part of the cleansing water 19 undergoes heat recovery with a $CO_2$ compressed gas 72 in a second heat exchanger 58 disposed downstream of the $CO_2$ compressor 71 in the $CO_2$ compressive line.

Since the $CO_2$ compressor 71 compresses the $CO_2$ accompanying gas 26 to be heated to a temperature of about 170° C., the heat of the gas is effectively used for heat exchange with the cleansing water.

Note that the present embodiment allows the cleansing water 19a to undergo heat exchange. However, the reflux water 29 may also be allowed to undergo heat exchange in the same manner as the cleansing water.

Now, a description will be made to preferred test examples that show the effects of the present invention. However, the present invention is not limited thereto.

Test Example 1

Test Example 1 employs the $CO_2$ recovery apparatus 10A of the first embodiment as a $CO_2$ recovery apparatus, and uses water as a heat medium for recovery of heat from a flue gas (at 200° C.) 12.

Studies were made on the $CO_2$ recovery heat unit when the heat-recovered superheated cleansing water 19b was introduced into the bottom portion of the absorbent regenerator 18. The medium after heat recovery is compressed water (at 180° C. and 10 kg/cm² G).

Figure 6:
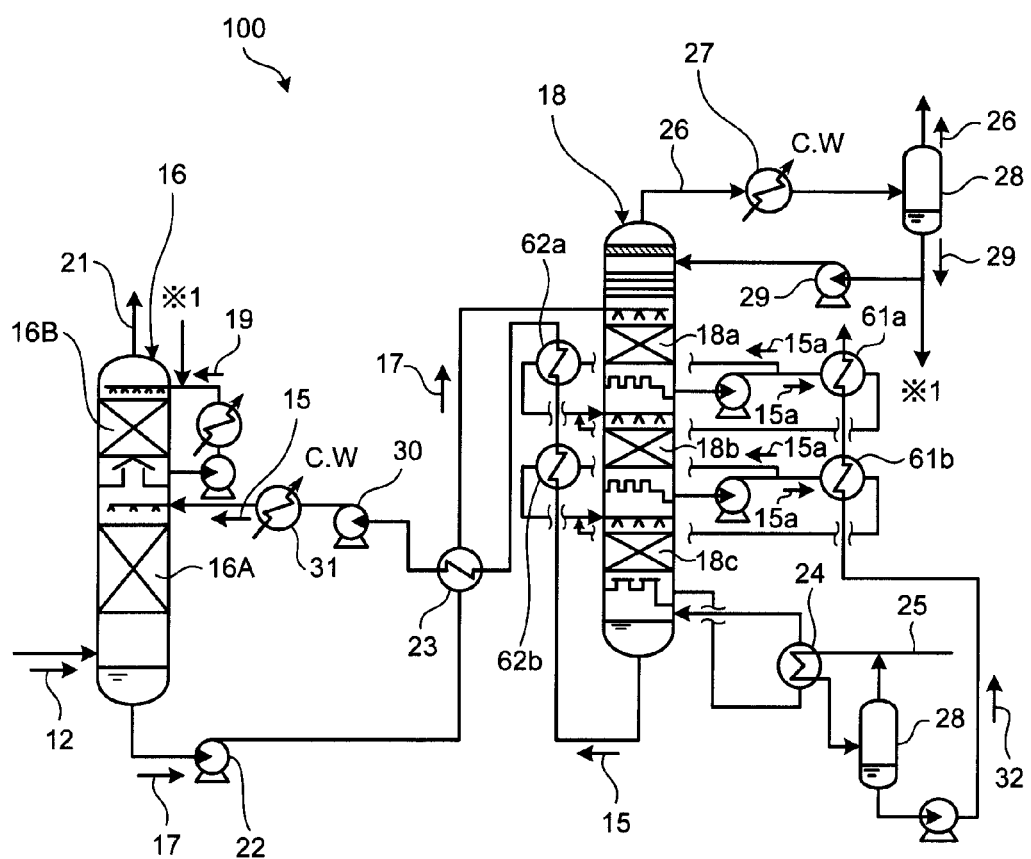
FIG. 6 is a schematic view illustrating the configuration of a $CO_2$ recovery apparatus according to a comparative example.

FIG. 6 is a schematic view illustrating the configuration of a conventional $CO_2$ recovery apparatus according to a first comparative example.

As shown in FIG. 6, a $CO_2$ recovery apparatus 100 of the comparative example is different from the $CO_2$ recovery apparatus 10C of the third embodiment shown in FIG. 3 in that the former does not include the first heat exchanger 52 and the superheated cleansing solution supply line 53. This conventional system was employed as the reference.

In Test Example 1, the total amount of the cleansing water 19 in the cleansing section 16B with the circulating water stream excluded therefrom was supplied to the first heat exchanger 52 for heat recovery.

Furthermore, in Test Example 2, a half of the total amount of the cleansing water 19 in the cleansing section 16B with the circulating water stream excluded therefrom was supplied to the first heat exchanger 52 for heat recovery.

Furthermore, in Test Example 3, employed was the $CO_2$ recovery apparatus 10D shown in FIG. 4 to recover heat from the reflux water 29 in the heat exchanger 52.

The results are shown in Table 1.

TABLE 1

| | Heat Medium (Water supplied to Bottom Portion of Regenerator) | | | | |
| --- | --- | --- | --- | --- | --- |
| | Amount of Water ton/h | Heat Quantity required to recover (*1) MMkcal/h | Heat Quantity in Regenerative Superheater MMkcal/h | $CO_2$ Recovery Heat Source Unit kcal/kg-$CO_2$ | Reduction Ratio for Heat Unit % |
| Comparative Example | — | — | 12.99 | 624 | — |
| Test Example 1 | 11.2 | 1.54 | 11.41 | 548 | 12.2 |
| Test Example 2 | 5.6 | 0.77 | 12.13 | 582 | 6.7 |
| Test Example 3 | 1.9 | 0.26 | 12.72 | 610 | 2.1 |

(*1) Heat quantity required to compress Heat Medium to Water at 180° C. and 10 kg/cm²G As shown in Table 1, in Test Example 1, the heat quantity in the regenerative superheater of the comparative example of FIG. 6 was 12.99 MMkcal/h, and the $CO_2$ recovery heat source unit was 624 kcal/kg-$CO_2$.

In contrast to this, for Test Example 1, the heat quantity in the regenerative superheater was 11.41 MMkcal/h, while the $CO_2$ recovery heat source unit was 548 kcal/kg-$CO_2$. With that of the comparative example normalized to 100, the heat source unit was decreased by 12.2%, which shows that the amount of supplied water vapor is further reduced as compared with the conventional energy-saving process system.

Furthermore, for Test Example 2, the heat quantity in the regenerative superheater was 12.13 MMkcal/h, while the $CO_2$ recovery heat source unit was 582 kcal/kg-$CO_2$. With that of the comparative example normalized to 100, the heat source unit was decreased by 6.7%, which shows that the amount of supplied water vapor is further reduced as compared with the conventional energy-saving process system.

Furthermore, for Test Example 3, the heat quantity in the regenerative superheater was 12.72 MMkcal/h, while the $CO_2$ recovery heat source unit was 610 kcal/kg-$CO_2$. With that of the comparative example normalized to 100, the heat source unit was decreased by 2.1%, which shows that the amount of supplied water vapor is further reduced as compared with the conventional energy-saving process system.

| [Explanations of Letters or Numerals] | |
|---|---|
| 10A to 10E | $CO_2$ recovery apparatus |
| 11 | industrial combustion facility |
| 12 | flue gas |
| 14 | flue gas cooling apparatus |
| 15 | $CO_2$ absorbent (lean solution) |
| 16 | $CO_2$ absorber |
| 17 | $CO_2$-absorbed $CO_2$ absorbent (rich solution) |
| 18 | absorbent regenerator |
| 19 | cleansing water |
| 19a | part of cleansing water |
| 19b | superheated cleansing solution |
| 52 | first heat exchanger |
| 58 | second heat exchanger |

The invention claimed is:

1. A $CO_2$ recovery apparatus comprising:
a $CO_2$ absorber for bringing a $CO_2$ containing gas and a $CO_2$ absorbent into contact with each other so as to reduce $CO_2$ and release $CO_2$ reduced gas;
an absorbent regenerator for allowing a $CO_2$ absorbed rich solution to be regenerated in a regenerative superheater and outputting a $CO_2$ accompanying gas that accompanies water vapor; wherein a lean solution with $CO_2$ reduced in the absorbent regenerator is recycled in the $CO_2$ absorber as the $CO_2$ absorbent;
a cleansing section disposed downstream of a gas flow in the $CO_2$ absorber, for bringing the $CO_2$ reduced gas and a cleansing solution into contact with each other;
a reflux line for condensing the water vapor accompanied by the $CO_2$ accompanying gas so as to return the condensed water as reflux water to the absorbent regenerator;
a supplying line for adding a part of the reflux water to the cleansing solution;
a first heat exchanger disposed in a boiler flue gas duct, for extracting a part of the cleansing solution so as to exchange heat with the part of the cleansing solution; and
a superheated cleansing solution supply line for introducing the superheated cleansing solution that has heat exchanged in the heat exchange section into a bottom portion of the absorbent regenerator.

2. The $CO_2$ recovery apparatus according to claim 1, wherein
the absorbent regenerator is divided at least into two, and the $CO_2$ recovery apparatus comprises:
a semi-lean solution divert line for diverting a semi-lean solution with $CO_2$ partially reduced from an upper stage of the divided absorbent regenerator to supply to a lower stage of the absorbent regenerator, and
a steam condensed water heat exchanger, disposed in the semi-lean solution divert line, for heating the semi-lean solution by afterheat of steam condensed water from the regenerative superheater.

3. The $CO_2$ recovery apparatus according to claim 2, wherein
the semi-lean solution divert line is provided with a lean solution heat exchanger for heating a semi-lean solution using heat of the lean solution from the absorbent regenerator.

4. The $CO_2$ recovery apparatus according to claim 1, wherein
a rich/lean solution heat exchanger for heating the rich solution using afterheat of the lean solution is disposed at an intersection of a rich solution supply line for supplying the rich solution from the $CO_2$ absorber to the regenerative superheater and a lean solution supply line for supplying the lean solution from the absorbent regenerator to the $CO_2$ absorber.

* * * * *